Figure 1:
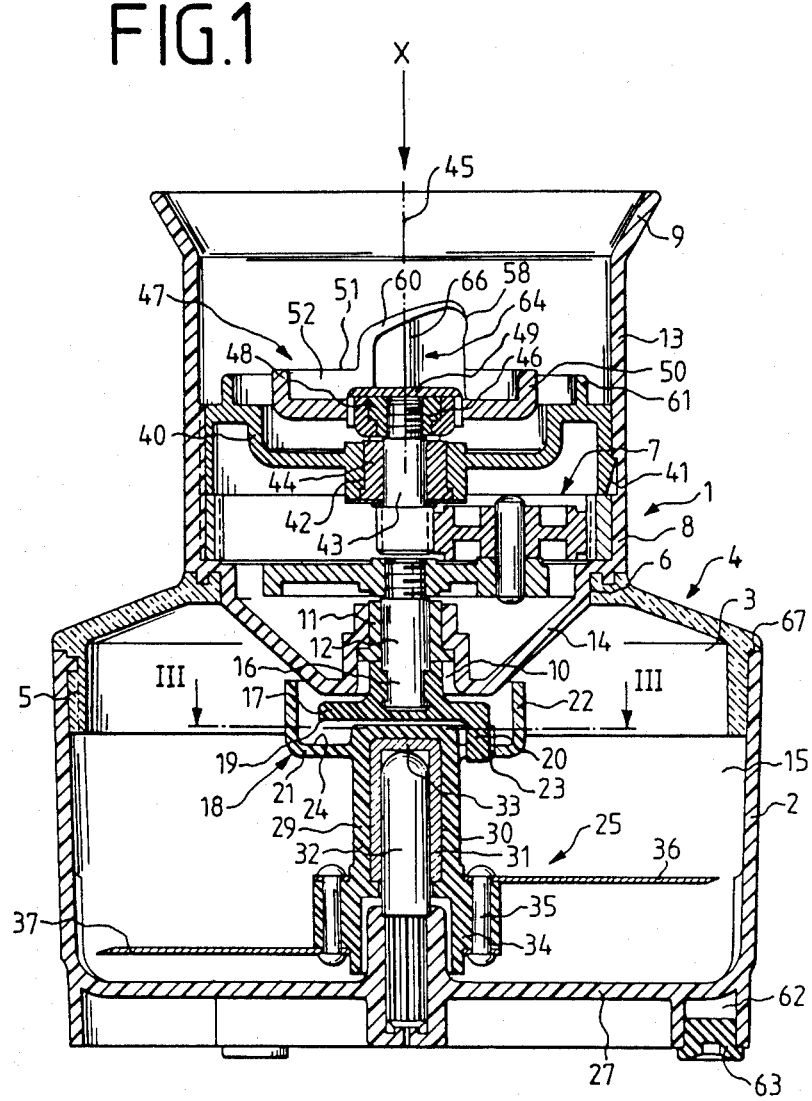

United States Patent [19]

Rebordosa et al.

[11] Patent Number: 4,725,008

[45] Date of Patent: Feb. 16, 1988

[54] ATTACHMENT FOR AN ELECTRICAL KITCHEN MACHINE

[75] Inventors: Antonio Rebordosa; Vincente Safont; Pedro Pares, all of Barcelona, Spain

[73] Assignee: Braun Aktiengesellschaft, Frankfurt, Fed. Rep. of Germany

[21] Appl. No.: 923,976

[22] Filed: Oct. 28, 1986

[30] Foreign Application Priority Data

Nov. 2, 1985 [FR] France .................................. 3538967

[51] Int. Cl.⁴ ............................................. B02C 18/10
[52] U.S. Cl. ............................... 241/101.1; 241/101.2; 241/282.2
[58] Field of Search .................... 241/101.2, 92, 101.1, 241/282.1, 282.2, 285 R; 366/601, 142

[56] References Cited

U.S. PATENT DOCUMENTS 3,465,800 9/1969 Michaelis .......................... 241/101.2

FOREIGN PATENT DOCUMENTS 1822613 12/1960 Fed. Rep. of Germany .
1822614 12/1960 Fed. Rep. of Germany .
360775 4/1962 Switzerland .

Primary Examiner—Mark Rosenbaum

[57] ABSTRACT

The attachment 1 is composed of a container 2 closable by a lid 4 and including a rotatably supported utensil 25 for chopping and/or mixing food, the said utensil 25 of the attachment 1 being drivable via a first coupling arrangement 18 by the drive unit acting upon the utensil of the kitchen machine. Connected in front of the first coupling arrangement 18 is a gear unit 7 which is integrated into the lid 4 of the container 2 and connected in front whereof is a second coupling half 47 for the formation of a second coupling arrangement.

18 Claims, 3 Drawing Figures

ATTACHMENT FOR AN ELECTRICAL KITCHEN MACHINE

The present invention relates to an attachment for an electrical kitchen machine, in particular for a minipimer which comprises a container closable by a lid and including a rotatably supported utensil for chopping and/or mixing food, the said utensil of the attachment being drivable via a first coupling arrangement by a drive unit acting upon the utensil of the kitchen machine.

A like attachment for a minipimer is known from German utility model No. 1 822 614. The minipimer comprises a drive shaft which is enclosed by a shield tube and which is connectible at its free end with various utensils by means of a bayonet-type lock. Depending on the way the food is trated, a utensil disc appropriate for this purpose is mounted on the shaft end of the minipimer. To prevent injuries, the said utensil disc is encompassed radially outwardly by a basket-like hood which is kept stationarily on the tubular shell of the minipimer.

To chop meat, parsley, garlic etc., a blade device rotating in an attachment serves as utensil, the said blade device—in contrast to the other utensils mentioned—comprising a longer shaft butt for connection of the drive shaft and thereby being disposed beneath the hood in the attachment. The lid of the attachment has a central opening, at the edge of which the hood can be secured to the lid in positive engagement therewith by means of a bayonet-type lock. It is to be accomplished hereby that the blade device will always be disposed concentrically in relation to the container.

It is to be regarded as less favourable in this attachment that the risk of injuries is not eliminated, since for mounting the blade device the shaft butt is required to be inserted from below through the opening in order to be able to couple the shaft butt with the drive shaft. Only then is it possible to mount the lid fastened to the hood onto the container in positive engagement therewith. Another shortcoming is to be seen in that, in the event of the hood detaching from the lid during operation, the blade device may destroy the lid and also the container so that likewise injuries connot be precluded.

It is considered to be another disadvantage that in consequence of the frequent occurrence of very high numbers of revolutions in such minipimers the matter to be ground will have reached already a pasty condition even if the minipimer is switched off again immediately upon its switching on, what is not desirable for many foodstuffs. Consequently it is difficult to achieve a desired size of the ground matter with such minipimer system.

Therefore, it is the object of the present invention to design an attachment for a kitchen machine, in particular for a minipimer, which permits an automatic coupling of the drive unit of the kitchen machine without the exchange of component parts, while the imminent risk of injuries is fully eliminated, which affords optimal cutting results and which lends itself to being easily and quickly opened and mounted. Moreover, the attachment is to permit ease of manufacture at low costs.

This object will be achieved by the present invention in that a gear unit is connected in front of the first coupling arrangement, in that the said gear unit is integrated in the lid of the container, and in that connected in front of the gear unit is a second coupling half for the formation of a second coupling arrangement. Owing to the two couplings the utensil provided in the attachment may not be driven after the container has been removed so that injuries are prevented also, without additional means, the minipimer can be mounted directly on the second coupling half of the attachment and can be operated instantaneously. Owing to the gear unit designed in the lid of the attachment, the rotational speed is not too high for the matter to be ground, and the container's volume can be fully utilized, contamination of the gear unit being avoided to a largest possible degree.

A particularly quick and uncomplicated coupling action will be achieved in that the second coupling half is movable into torsionally secured engagement with the utensil of the kitchen machine. In this arrangement, the utensil of the kitchen machine constitutes the second coupling half.

It is proposed in an improvement of the instant invention that the lid contains an opening, that the said opening is closed by a housing portion receiving the gear unit, that the first coupling arrangement is placed in the container beneath the lid and the housing portion, and that the gear unit and the second coupling half are designed above the lid in the housing portion and are accessible from the exterior. Due to this arrangement, the gear unit is placed entirely outside of the container so that contamination by the foodstuff is avoided. Besides, the housing portion serves to better handle the attachment.

To prevent the ingress of water into the gear unit when the lid is cleaned, the output shafts and drive shafts, respectively, coupled to the first and the second coupling arrangements, respectively, are accommodated sealingly in the housing portion.

A particularly simple action of coupling the utensil of the kitchen machine to the second coupling half is attained in that it consists of a disc, in that the said disc contains an indentation with an entraining surface arrangement serving for the anti-torsion accommodation of the utensil of the kitchen machine, and in that a coupling insertion device is designed at the entraining surface arrangement for introducing the utensil into the indentation. It will be accomplished thereby that the minipimer utensil is automatically inserted into the indentation designed at the second coupling half when the minipimer is mounted on the attachment, without the need for an operator to control this action. It is advantageous that the coupling insertion device is composed of wall elements upstanding from the disc, the end surfaces of these wall elements remote from the disc comprising ramps which extend towards the indentation in the direction of rotation of the utensil of the kitchen machine. To this end, the slope of the ramps is so steep that—as is the case in a thread without self-locking engagement—the second coupling disc will turn as long as until the minipimer utensil engages into the indentation. If it is easier to turn the minipimer utensil than the second coupling disc, then the minipimer utensil will turn instead of the coupling disc.

To ensure that forces are distributed as evenly as possible both onto the disc and onto the utensil when the minipimer is mounted, without the said two parts becoming hooked, and to simultaneously ensure centering of the utensil in the indentation with little force being needed, the entraining surface arrangement includes two diametrally opposed curved lateral surfaces, the curvature of said lateral surfaces increasing from the edge of the indentation in the direction of rotation radially inwardly, and that the wall elements are adjacent to the lateral surfaces without any steps.

In order to avoid injury by the cutter blade of the attachment, preferably the first coupling arrangement is moved into anti-torsion engagement only after the lid has been fastened on the container.

To safeguard that the lid is rapidly fastened and secured on the container, the fastening of the lid on the container is constituted by thread engagement and the lid, when in its mounted position, forms a stop with the housing. The contact force generated when the minipimer is mounted on the secong coupling half is thereby transmitted via the lid onto the container without causing any damage. To this effect, it is preferred that the thread engagement comprise a multiple thread without self-locking engagement and that the courses of thread cover only a fraction of a course of thread, the courses of thread being spread evenly over the periphery of the lid and the container, respectively. Owing thereto, the thread coupling can be brought into engagement easily on minor rotation of the lid.

To safeguard separation of the utensil of the attachment from the coupling when the container is opened, the first coupling arrangement is composed of a plate which can be driven by the output shaft on the gear unit side, the plate's bottom side facing the utensil of the attachment including at least one protruding prong-shaped projection which engages into a recess in the utensil of the attachment. The coupling arrangement formed thereby is simple in construction and lends itself to ease of manufacture without necessitating any great technical means. To render the coupling arrangement operable at any time and to prevent it from becoming plugged by food, the recess is shaped in the bottom of a sleeve open towards the plate and the peripheral surface of the sleeve confines the plate.

To ensure that also the first coupling arrangement will automatically engage when the lid is put on the container, the bottom of the utensil coupling is penetrated preferably by three recesses which are evenly distributed over the periphery and into which preferably three projections engage and annular portions intermediate the recesses function as inclined planes, and serve to introduce the projections into the recesses.

It is an advantage that the housing portion is of substantially cylindrical configuration and that it extends above the second coupling half. This facilitates the mounting and the centering of the minipimer on the attachment, and ease of handling of the attachment during operation and during the assembly is improved.

One embodiment of this invention will be described in more detail hereinbelow with reference to the accompanying drawings.

Figure 2:
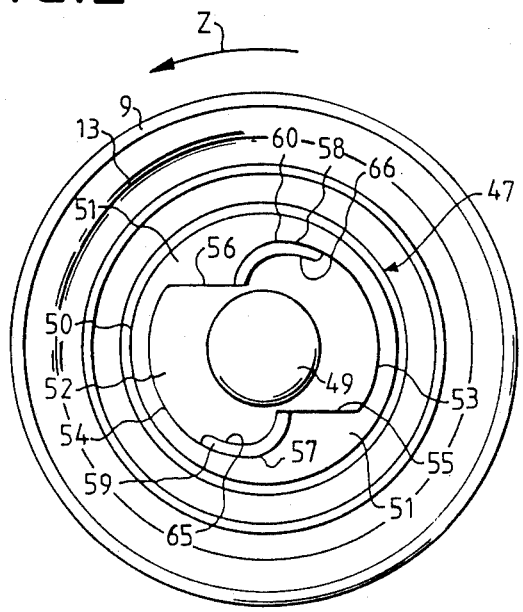
Figure 3:
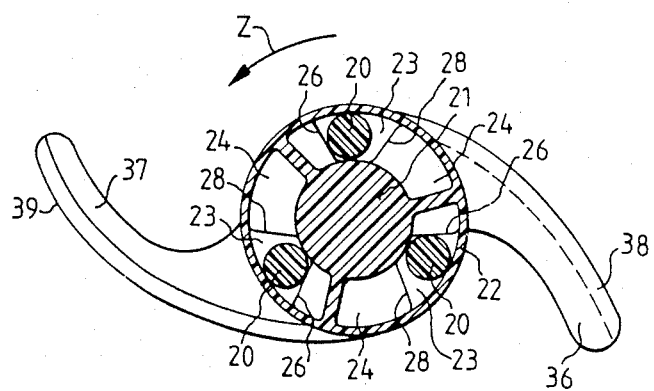

In the drawings,

FIG. 1 is a longitudinal cross-section through the attachment according to the present invention, FIG. 2 is a top view of the attachment in the direction of the arrow x according to FIG. 1, and FIG. 3 is a cross-section taken through the sleeve along the line of intersection III—III according to FIG. 1.

In FIG. 1 the attachment 1 is composed of a cylindrical container 2 whose opening 3 is closable by a lid 4. Said lid 4 is in anti-torsion engagement with the container 2 through a multiple thread without self-locking engagement 5 whose three courses of thread are arranged offset by 120° degree at the periphery of the container 2 and the lid 4. Said container 2 forms a stop 67 together with the lid 4. Starting from the container 2, the lid 4 made of transparent plastics extends conically upwardly, when viewing in the drawing, and contains a central opening 6 wherein a housing portion 8 receiving a planetary gear 7 is inserted sealingly, e.g. by means of bonding. Above the opening 6, the housing portion 8 extends substantially as a cylindrical portion 13 and enlarges conically at its free end 9. Beneath the opening 6, the housing portion 8 extends downwardly as a funnel-shaped portion 14 and terminates in the lower area in a central bore 10 in which a slide bearing 11 is incorporated. Said slide bearing 11 serves to guide and to seal the output shaft 12 exiting from the planetary gear 7 downwardly. At the free end 16 of output shaft 12 projecting into the container interior 15, an upper coupling half of the first coupling arrangement 18 is secured in positive and anti-torsion engagement, the said upper coupling half being designed as plate 17.

In FIGS. 1 and 3, prong-shaped projections 20 which are arranged at an angle of 120° in relation to one another and on the same diameter protrude from the bottom side 19 of the plate 17. In the mounted position of the attachment 1, these prong-shaped projections 20 project into recesses 23 arranged at the bottom 21 of the sleeve 22. The annular portions 24 designed in circumferential direction intermediate the recesses 23 in the bottom 21 are established by inclined planes which extend from the upper side downwards in the direction of rotation z of the utensil 25. Said inclined planes 24 consequently have their highest point at the location 26 and their deepest point at the location 28. The deepest locations 28 are closer to the bottom 27 than the highest locations 26.

Below sleeve 22 in FIG. 1 is a tubular portion 29 in which a slide bearing sleeve 31 is fastened in a blind-end bore 30. A journal pin 32 fitted in the bottom 27 of the container 2 extends into the slide bearing sleeve 31 and abuts with its free end on the bottom 33 of the slide bearing sleeve 31. Below tubular portion 29 in FIG. 1 is an annular collar 34 at which, by means of rivets 35, diametrally opposite sickle-shaped blades 36, 37 are positively engaged. In FIG. 3, the cutting edges 38, 39 are placed at the rear edge of the blades 36, 37 when viewed in the direction of rotation Z. The sleeve 22, the tubular portion 29, the slide bearing sleeve 31, the annular collar 34, the rivets 35 and the blades 36, 37 constitute the utensil 25 of the attachment 1.

Above the funnel-shaped portion 14 in FIG. 1 is the planetary gear 7 which need not be dealt with more closely herein as it has been state of the art knowledge for long. In this embodiment, the planetary gear 7 is designed as a reduction gear and, in the drawing, is closed from the upper side by a housing cover 40 which is fastened in the cylindrical portion 13 in positive and sealing engagement therewith, e.g. by means of a snap-on engagement 41. Said housing cover 40 contains a central bore 42 accommodating a slide bearing 44 for the support of the drive shaft 43. The drive shaft 43, the output shaft 12, the utensil 25 and the journal pin 32 are placed on one common center line 45.

The drive shaft 43 penetrates the housing cover 40 upwardly in the drawing. On top of the housing cover 40, the free end of the drive shaft 43 is furnished with a thread 46 on which a nut 48 is screwed for the purpose of fastening the second coupling half 47 to the drive shaft 43. To keep the thread 46 and the nut 48 free from corrosion, a cap 49 is fitted from above on the second coupling half 47, to be seen in the drawing.

Said second coupling half 47 substantially is composed of a disc at whose edge annular collar 50 is raised up. The end surface 51 of the annular collar 50 extends as is shown in the top view of FIG. 2. Formed radially within the annular collar 50 is an indentation 52 into which the utensil of the minipimer not illustrated in the drawing is inserted.

As is displayed in FIG. 2, the indentation 52 is formed by substantially diametrally opposed circular segments 53, 54 which are confined by lateral surfaces 55, 56. Said lateral surfaces 55, 56 form the entraining surface arrangement for the utensil driven by the minipimer. Diametrally opposite sickle-shaped wall elements 57, 58 raise up from the end surface 51, the lateral surfaces 65, 66 of which wall elements form one common plane with the lateral surfaces 55, 56 and which serve as coupling insertion device 64 for the utensil of the minipimer. The end surfaces 59, 60 arranged at the free ends of the wall elements 57, 58 are designed as ramps which are declining towards the second coupling half 47 in the direction of rotation Z.

Designed radially outside of the second coupling half 47 at the housing cover 40 is an annular collar 61 which extends upwadly in the drawing and which serves for centering the hood protectingly encompassing the utensil of the minipimer.

To prevent the attachment 1 from co-rotating during operation, rubber plugs 63 are fitted at the underside of the bottom 27 in fastening holes 62 provided for this purpose.

To avoid repetitions, like component parts have been designated by like reference numerals in FIGS. 1 to 3.

The mode of operation of the attachment is as follows:

With the container 2 opened, first the utensil 25 is put on the journal pin 32. Now the lid 4 with the integrated housing portion 8, the planetary gear 7 and the first and the second coupling halfs 17, 47 is mounted on the opening 3 of the container 2. As soon as the multiple thread 5 engages, the lid 4 with the housing portion 8 will automatically turn into the multiple thread 5 until the lid 4 abuts on the stop 67 at the upper edge of the container 2. In case the prong-shaped projections 20 are not initially aligned with the recesses 23, they first abut on the locations 26 of the annular portions 24, and the utensil 25 will turn until the projections 20 catch into the recesses 23 due to the axial shift caused by the rotary movement of the lid 4. The rotation of the utensil 25 is attained in that the projections 20, on account of the weight of the lid 4, act upon the inclined planes 24 with a normal force resulting therefrom. In this arrangement, the inclined planes 24 are similar to a thread without self-locking engagement. The attachment 1 is ready for operation.

Now the non-illustrated minipimer can be mounted on the second coupling half 47. In this action, the minipimer centers between the annular collar 61 and the inner wall of the cylindrical portion 13 by virtue of the hood likewise not illustrated. If, when mounted, the utensil of the minipimer does not directly catch into the indentation 52 of the second coupling half 47, the utensil being rotationally offset relative to the indentation 52, the said utensil will first abut on the end surfaces 59, 60. Owing to the end surfaces 59, 60 not acting self-lockingly, the second coupling half 47 will turn due to the normal force exerted by the utensil of the minipimer until the utensil of the minipimer engages into the indentation 52.

When now the minipimer is switched on, the lateral surfaces of the utensil will abut on the lateral surfaces 55, 56 of the second coupling half 47 and, subsequently, will cause the second coupling half 47 to rotate. This rotary movement is transmitted via the drive shaft 43 and the planetary gear 7 onto the output shaft 12. To this end, the planetary gear 7 is designed such that the drive shaft and the output shaft 43, 12 perform rotation in the same direction. From the output shaft 12, the rotary movement is transmitted via the first coupling arrangement 18 onto the utensil 25. In consequence of the rotational speed of the utensil 25, the food in the container 2 is chopped and/or mixed.

After the chopping and/or mixing action is completed, first the minipimer is switched off, and then it is removed from the second coupling half 47. Turning the lid 4 permits it to be taken off from the container 2, and the processed food can be removed from the container 2. Owing to the simple design of the attachment 1, it lends itself to being handled and cleaned particularly easily. The utensil 25 can be removed from the container 2 without additional mounting tools.

We claim:

1. An attachment for an electrical kitchen machine, comprising
    container structure that has an upwardly open top,
    a utensil rotatably supported in said container structure for chopping and/or mixing food, said utensil including coupling structure,
    lid structure for closing said upwardly open top of said container structure,
    a gear unit integrated in said lid structure,
    first coupling structure carried by said lid structure for releasably coupling said gear unit to said utensil coupling structure in said container structure, and
    second coupling structure carried by said lid structure for releasably coupling said gear unit to a drive unit of said kitchen machine.

2. The attachment of claim 1 wherein said second coupling structure is arranged for rotational driving engagement with a utensil of said kitchen machine.

3. The attachment of claim 1 wherein said lid structure has an opening and further including housing structure in which said gear unit is disposed, said lid structure opening being closed by said gear unit housing structure, said first coupling structure being located in said container structure beneath said lid and said housing structure when said lid structure is secured on said container structure, and said gear unit and said second coupling structure being located above said lid member and being externally accessible.

4. The attachment of claim 3 wherein said housing structure is of cylindrical configuration and includes an upwardly extending portion that extends above said second coupling structure.

5. The attachment of claim 3 wherein said gear unit includes a drive shaft and an output shaft that are coupled to said gear unit, said drive shaft and output shaft being sealingly accommodated in said housing structure.

6. The attachment of claim 1 wherein said second coupling structure includes a disc, said disc having an indentation with entraining surface structure for antitorsion accommodation of a utensil of said kitchen machine and coupling insertion structure adjacent said entraining surface structure for inserting said kitchen machine utensil into said indentation.

7. The attachment of claim 6 wherein said coupling insertion structure includes wall elements that are upstanding from said disc, the end surfaces of said wall elements remote from said disc including ramp surfaces which extend towards said indentation in the direction of rotation of said kitchen machine utensil.

8. The attachment of claim 7 wherein said entraining surface structure includes two diametrally opposed curved lateral surfaces, the curvature of said lateral surfaces increasing from the edges of said indentation in the direction of rotation of said kitchen machine utensil radially inward, and wherein said wall elements merge with said lateral surfaces.

9. The attachment of claim 1 wherein said first coupling structure is arranged to engage said utensil coupling structure in said container only after said lid structure has engaged said container structure.

10. The attachment of claim 8 wherein said lid structure and said container structure include cooperating thread type fastening structure and said lid structure further includes stop structure for engagement with said container structure.

11. The attachment of claim 10 wherein said thread-type fastening structure includes plural thread elements, said thread elements being spaced evenly around the periphery of said lid structure and said container structure, each said thread element extending only a fraction of the periphery of said lid structure.

12. The attachment of claim 1 wherein said gear unit includes a drive shaft and an outer shaft that are coupled to said gear unit, and said first coupling structure includes a plate coupled to said gear unit output shaft, said plate having at least one protruding prong-shaped projection on the side of said plate remote from said gear unit, and said utensil coupling structure includes recess defining structure for receiving said protruding prong-shaped projection.

13. The attachment of claim 12 wherein said utensil coupling structure includes an upwardly open sleeve that has a cylindrical peripheral wall, said recess is at the bottom of said sleeve, and said plate is adapted to be received within said sleeve.

14. The attachement of claim 12 wherein said utensil coupling structure includes a plurality of evenly spaced recesses, and said plate has a corresponding plurality of projections, said utensil coupling structure further including inclined plane surfaces for inserting said projections into said recesses.

15. An attachment for an electrical kitchen machine, comprising
container structure that has an upwardly open top,
a utensil rotatably supported in said container structure for chopping and/or mixing food, said utensil including coupling structure,
lid structure including a lid member for closing said upwardly open top of said container structure and housing structure, a gear unit disposed in said housing structure,
first coupling structure carried by said lid structure for releasably coupling said gear unit to said utensil coupling structure in said container structure, said first coupling structure being located in said container structure beneath said lid and said housing structure when said lid structure is secured on said container structure, said first coupling structure being arranged to engage said utensil coupling structure in said container only after said lid structure has engaged said container structure, and
second coupling structure carried by said lid structure for releasably coupling said gear unit in rotational driving engagement with a utensil of said kitchen machine, said second coupling structure being located above said lid member and being externally accessible.

16. The attachment of claim 15 wherein said lid structure and said container structure include cooperating thread type fastening structure that includes plural thread elements, said thread elements being spaced evenly around the periphery of said lid structure and said container structure, each said thread element extending only a fraction of the periphery of said lid structure, and said lid structure further includes stop structure for engagement with said container structure.

17. The attachment of claim 15 wherein said gear unit includes a drive shaft and an output shaft that are coupled to said gear unit, and said first coupling structure includes a plate coupled to said gear unit output shaft, said plate having a plurality of protruding prong-shaped projections on the side of said plate remote from said gear unit, and said utensil coupling structure includes an upwardly open sleeve that has a cylindrical peripheral wall, structure defining a plurality of evenly spaced recesses for receiving said protruding prong-shaped projections at the bottom of said sleeve, said plate being adpated to be received within said sleeve, and said sleeve further including inclined plane surfaces for inserting said projections into said recesses.

18. The attachment of claim 15 wherein said second coupling structure includes a disc, said disc having a indentation with entraining surface structure for anti-torsion accommodation of said kitchen machine utensil and coupling insertion structure adjacent said entraining surface structure for inserting said kitchen machine utensil into said indentation, said coupling insertion structure including wall elements upstanding from said disc, the end surfaces of said wall elements remote from said disc including ramp surfaces which extend towards said indentation in the direction of rotation of said kitchen machine utensil, and said entraining surface structure including two diametrally opposed curved lateral surfaces, the curvature of said lateral surfaces increasing from the edge of said indentation in the direction of rotation of said kitchen machine utensil radially inward.

* * * * *

UNITED STATES PATENT AND TRADEMARK OFFICE
CERTIFICATE OF CORRECTION

PATENT NO. : 4,725,008
DATED : February 16, 1988
INVENTOR(S) : Antonio Rebordosa, et al.

It is certified that error appears in the above-identified patent and that said Letters Patent are hereby corrected as shown below:

Col. 1, line 17, "trated" should be --treated--;
      line 44, "connot" should be --cannot--.

Col. 3, line 67, delete "degree".

Col. 5, line 2, after "edge", --an-- should be inserted.
      line 24, "upwadly" should be --upwardly--.

Claim 8, Col. 7, line 11, "edges" should be --edge--.

Claim 10, Col. 7, line 19, "8" should be --9--.

Signed and Sealed this

Twentieth Day of December, 1988

Attest:

DONALD J. QUIGG

*Attesting Officer*      *Commissioner of Patents and Trademarks*